United States Patent
Johnson et al.

(10) Patent No.: US 6,798,877 B2
(45) Date of Patent: *Sep. 28, 2004

(54) ENHANCED END USER AUTOMATIC CALL DISTRIBUTOR CONTROL

(75) Inventors: John Andrew Johnson, Wheaton, IL (US); Eric Edward Kampmeier, Sycamore, IL (US); Steven Robert Krause, Naperville, IL (US); David B. Smith, Hinsdale, IL (US); Matthew Richard Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 489 days.

This patent is subject to a terminal disclaimer.

(21) Appl. No.: 09/886,795

(22) Filed: Jun. 21, 2001

(65) Prior Publication Data

US 2002/0196928 A1 Dec. 26, 2002

(51) Int. Cl.⁷ .............................................. H04M 3/523
(52) U.S. Cl. ........................... 379/266.01; 379/265.09; 379/265.11; 379/266.06
(58) Field of Search ...................... 379/265.01, 265.02, 379/265.09, 265.11, 265.13, 265.14, 266.01, 266.02, 266.03, 266.04, 266.05, 266.06, 266.09

(56) References Cited

U.S. PATENT DOCUMENTS

| | | | |
|---|---|---|---|
| 5,036,535 A | | 7/1991 | Gechter et al. ......... 379/265.11 |
| 5,657,383 A | | 8/1997 | Gerber et al. .......... 379/266.01 |
| 5,884,032 A | * | 3/1999 | Bateman et al. ............ 709/204 |
| 6,046,762 A | * | 4/2000 | Sonesh et al. ........... 348/14.11 |
| 6,212,270 B1 | | 4/2001 | Garland et al. ........ 379/218.02 |
| 6,366,668 B1 | * | 4/2002 | Borst et al. ............ 379/266.04 |

* cited by examiner

Primary Examiner—Harry S. Hong

(57) ABSTRACT

A method and apparatus for controlling administration of Automatic Call Distributor (ACD) queues of an ACD or network of ACDs by a caller, and of communicating data to an ACD Agent. The caller receives information concerning the status of queues in one or a plurality of ACDs. If the caller wishes to communicate with a particular Agent, wait time for that Agent is provided to the caller. The caller can select a particular Agent, and will be connected when that Agent becomes available subject to other restrictions of the ACD queue. The caller can prepare information for transmission to an answering Agent while the caller waits. Advantageously, the caller can control which Agent or which sub-group of Agents should respond to his/her call, taking into account the different waiting times associated with a particular Agent or the first available Agent when the caller reaches the top of the queue.

20 Claims, 10 Drawing Sheets

ENHANCED END USER AUTOMATIC CALL DISTRIBUTOR CONTROL

RELATED APPLICATION

This Application is relate to Applications entitled, "End User Automatic Call Distributor Network Control", Ser. No. 09/886,804, and "Communication of User Data to an Automatic Call Distributor Agent", Ser No. 09/886,790, by the inventors of this Anplication, and "Enhanced Agent Automatic Call Distributor Control", Ser. No. 09/886,877, by D. B. Smith and M. R. Smith, filed concurrently with this Application on Jun. 21, 2001 and assigned to the same Assignee as this Application.

TECHNICAL FIELD

This invention relates to the control of an Automatic Call Distributor (ACD) by a caller using control messages sent over the Internet.

PROBLEM

An Automatic Call Distributor (ACD), is an arrangement for connecting a caller to one of a plurality of Agents served by that ACD. Many highly flexible arrangements for Automatic Call Distributors exist in the prior art. One highly flexible scheme is described in Gechter et al: U.S. Pat. No. 5,036,535, which discloses arrangements for routing an incoming call to the most appropriate Agent that is available. The selection of that Agent is carried out by an overall control system which is aware of the current status of all Agents, and of a user profile of callers. This system is also arranged as are many other ACDs, to accept input from callers, usually in the form of Dual-Tone Multi-Frequency (DTMF) signals, keyed in response to announcement queries from the ACD. A problem of the prior art is, that this type of control of the ACD gives very little opportunity for callers to interact with the ACD, and to select an optimum queue path for finding an appropriate Agent to serve their call, since, in the prior art, the selection process is handled almost entirely by the control of the ACD in a single tree-type selection process. Further, in the prior art, ACDs are viewed as stand-alone systems, not as part of an ACD network. Further, communication of data to an ACD Agent is inefficient and time-consuming, and may require the caller to hang up and restart the process.

SOLUTION

The above problems are substantially alleviated and an advance is made over the teachings of the prior art in accordance with this invention, wherein an ACD is supplied with a User Controller such as a Personal Computer (PC), which interacts with a caller to provide information to the caller and to receive call direction information from the caller, and interacts with the Call Controller means of the ACD for establishing connections between the caller and a selected Agent, or between the caller and another ACD of an ACD network for completion by that other ACD. Advantageously, this allows the caller to control the selection of an appropriate Agent. In one preferred embodiment of the invention, a connection is established between the caller's PC or data terminal and the PC User Controller of the ACD. The PC User Controller has access to the queues in the ACD in order to estimate the time required to reach a particular Agent, a particular sub-group of Agents, or any of the group of Agents handling the type of request that the user is making. The actual physical connection is between a user station and an Agent position. An Agent position is the means to permit an Agent to send and receive control signals to and from the ACD, and to provide a voice connection for the Agent.

For an ACD Network, one ACD is usually required to act as a Control ACD. This Control ACD controls hand-offs among ACDs, and monitors communications among the ACDs.

In accordance with one feature of Applicants' preferred embodiment, many, if not most of the customer stations equipped to communicate with the Controllers of the ACD, are combined stations which communicate data for accessing queues and information storage of the ACD, and which also use the Internet querying connection for a talking connection to the Agent. Advantageously, the Internet can be used for both purposes.

DETAILED DESCRIPTION

Figure 1:
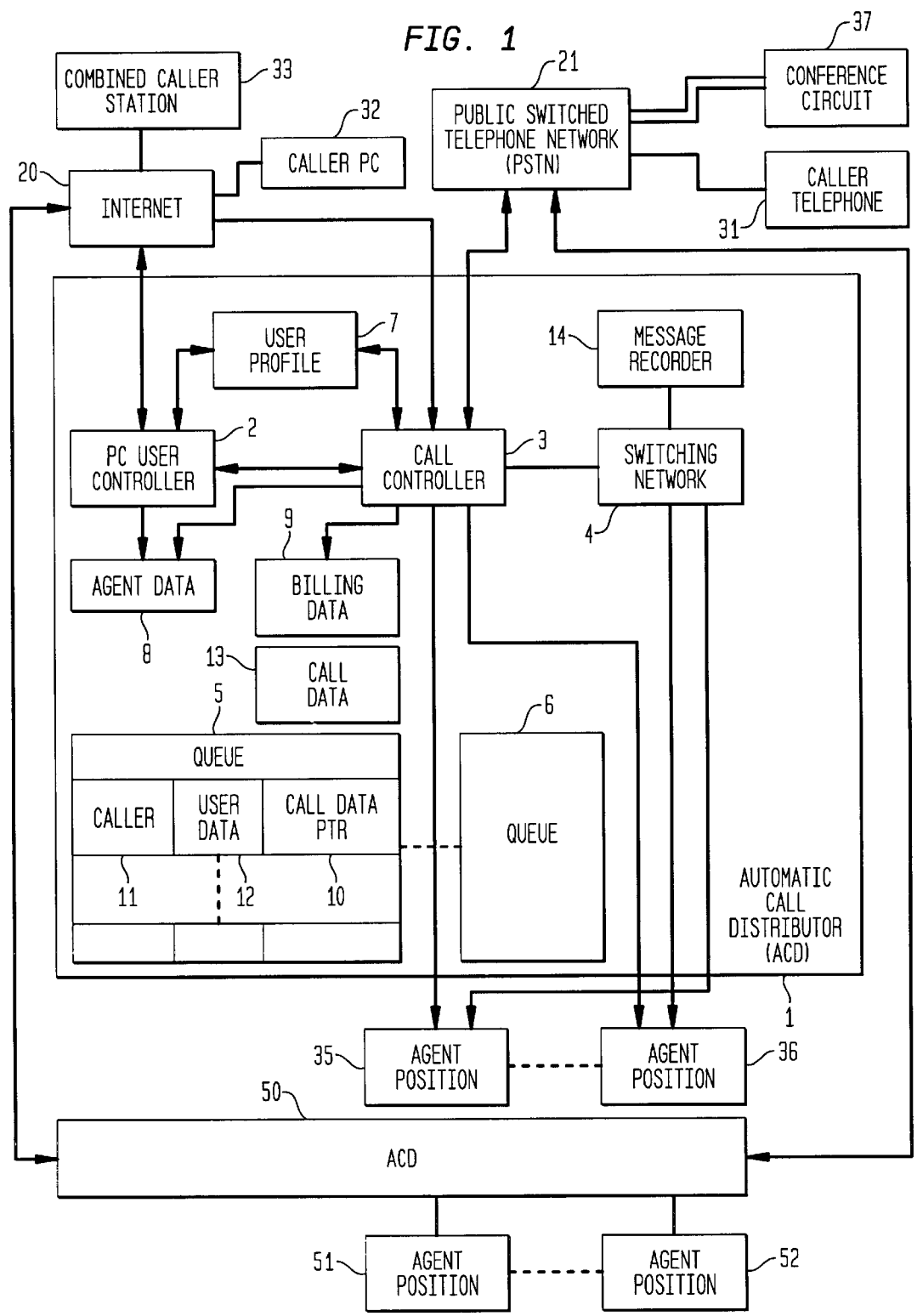
FIG. 1 is a block diagram illustrating the operation of Applicants' invention.

FIG. 1 is a block diagram illustrating the operation of Applicants' invention. An Automatic Call Distributor (1) is connected to a plurality of Agent positions (35), . . . , (36), and to the Public Switched Telephone Network (PSTN) (21) and the Internet (20). A caller has a Personal Computer (PC) (32) or some other intelligent device such as a wireless web PC, connectable or connected to the Internet, and a caller telephone (31) connected to the PSTN. In alternate configurations, the Internet can also be used for transporting voice from the caller telephone. The Caller PC and the Caller Telephone can be combined, provided that the Caller PC is equipped with the proper sound card and software to process voice over IP calls; in that case, the voice portion of the call can be transmitted over the Internet. The ACD can serve customers who do not have PCs, and can serve them in accordance with the teachings of the prior art. The latter type of call will not be discussed further in this document.

When a caller wishes to make a call to some appropriate Agent position of the ACD, the caller establishes an Internet connection from the caller's PC (32) to a PC User Controller (2) of the ACD, or an ACD server in the case where multiple ACDs are interconnected. The PC User Controller has access to the information in the queues (5), . . . , (6), of the ACD, and has a connection to a Call Controller (3), which controls the establishment of connections within the ACD from inputs from the PSTN (21) via the Network (4), to a selected Agent position among Agent positions (35), . . . , (36). The Call Controller controls the ACD Agent position. The PC User Controller has access to user profile information in User Profile Data Block (7). This user profile information may contain information about the types of Agents that such a user would normally request, or might have indications, for example, that this user should be served from a VIP Queue. The PC User Controller has access to the queues (5), . . . , (6) of the ACD. For example, Queue 5, might be a VIP Queue, which is examined first before other queues. Alternatively, the queues can be used for functionally different purposes, such as Orders and Customer Service. A typical entry in a queue is Entry (10) in Queue (5), which includes information (11) for identifying the caller, and Data (12), describing the caller. This data can indicate, for example, that the caller wishes to be connected only to a particular Agent, or only to a particular sub-group of Agents. The data is used in examining entries in the queue to see if the caller identified in the queue can be connected to the Agent position which has most recently become available. In addition, the data can include a Pointer to a block of memory such as Call Data (13), which includes data supplied by the caller to describe the reasons for the call.

Many, if not most, of the callers will make use of the facility for inquiring about the status of the queues in the ACD, will have a Combined Caller Station (33). Such a Combined Caller Station can be used both for the data queries and data entry performed by Caller's PC (32), and the voice facilities of Caller Telephone (31). If a Combined Caller Station (33) is used, then the voice communication from the caller is transmitted via the Internet (20) without using the Public Switched Telephone Network (PSTN) (21).

Also, shown on FIG. 1, is a block (8) of Agent data for individual Agents of the ACD. This Agent data can be used for logging information and can be used to keep track of cases in which a particular Agent was requested, whether or not that Agent actually handled the call. This allows the Agent to return a call to make sure that the caller was completely satisfied with the handling of the call by another Agent. The Agent data can be used to generate statistics for better queue management, to track calls by Agent. It can also be used to store information related to customer issues, which might be viewed by other callers requesting a specific Agent.

Also, shown on FIG. 1, is a block (9) of billing data. Many ACDs are used to provide services for which the caller is billed. Examples of such services are technical support services provided by many software manufacturers. Billing data can include, for example, the identification of the caller, authorization check, billing okay, an indication of the category of the Agent in case different categories charge different hourly rates, the length of time of the call, and a credit card number for billing the customer. In case the call is subsequently transferred to an Agent at another ACD, this billing record can either be sent to the other ACD, or the Agent at the other ACD can return a billing record to the initial ACD, so that all charges are accumulated at that initial ACD. Billing data can also be used in conjunction with a product ordering entry system.

The Agent can send an authorization code to the caller, and ask for the code to be returned with the caller's datagram.

If the ACD is in another network, (e.g., a separate company), the billing authorization would start over. The Caller would see billing information displays showing cumulative changes.

Also, shown on FIG. 1, is another ACD (50) having similar facilities as ACD (1), and connected to Agent positions (51), . . . , (52). If an original Agent of ACD (1) finds on communicating with the caller, or possibly even on consulting the Call Data (13) entered by the caller, decides that another Agent at another ACD, such as ACD (50) should be either added to the call or simply be made the Agent for handling the call, then the facilities of Applicants' invention can be used by the first Agent to affect such an addition or transfer. The Agent at an Agent position of ACD (1) has the same capabilities as the caller for consulting the queues of ACD (50), and for entering the caller for the original Agent into one of these queues. It is possible to give an ACD Agent special privileges for making entries into the queue, such as the privilege of making an entry into a priority queue, whose entries are processed before entries in non-priority queues, or by marking a queue entry in an ordinary queue as a priority entry, and having the ACD check for priority entries in the queue before assigning an Agent position to handle a call in conformance with the discipline of an entry in an ordered queue, (i.e., first-in, first-out).

If a conference connection is to be established between the original caller and the original Agent and the added Agent, then a connection to PSTN (21) is made from both of the ACDs since, at this time, no Internet conference circuits exist. Conference Circuit (37) is accessed via the PSTN (21).

The display for the caller web browser of an Agent icon can indicate multiple Agents supporting a single function, (e.g., "Sales Support"), or can display information for a specific Agent.

If an Agent of ACD (50) is added to the call, or if the call is transferred to such an Agent, then the Call Data, such as Call Data (13), entered by the caller, as well as User Data (12) entered from records from within ACD (1), is sent to the added or transferred-to Agent position. In transmitting this information between the ACDs, care is taken to make sure that private information, or information which, for other reasons, is not to be transmitted to ACD (50), is blocked. The program of the PC User Controller (2) which controls the transfer of such information, contains facilities for performing this filtering.

Figure 2:
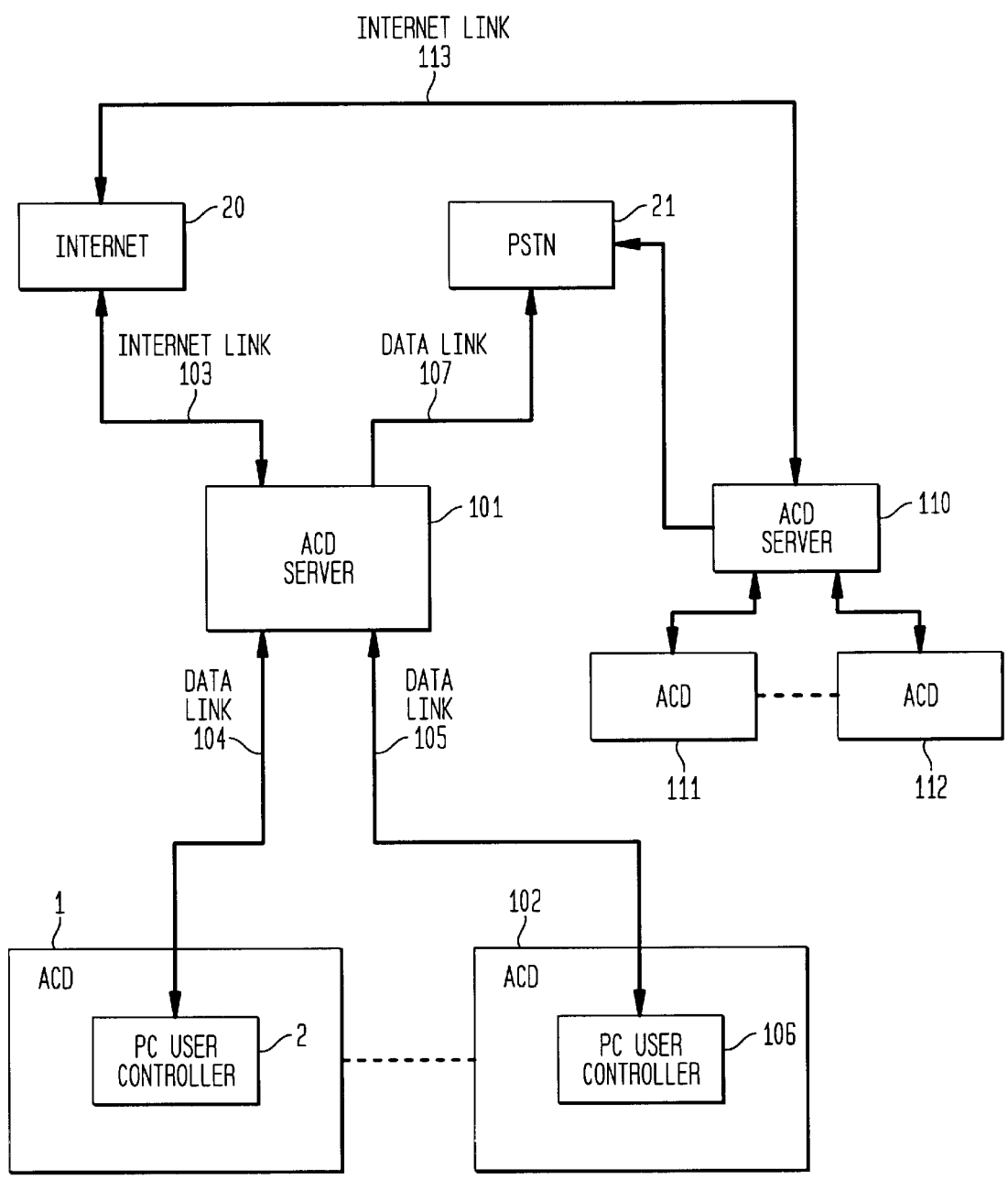
FIG. 2 is a block diagram illustrating the use of an ACD Server.

FIG. 2 illustrates a configuration wherein a separate ACD Server is interposed between the Internet and one or more ACDs (1), . . . , (102). The ACD Server communicates with callers via Internet link (103), and also with the PC User Controller of one or more ACDs via data links (104), . . . , (105). The ACD Server can select which of a plurality of ACDs should receive PC messages from the caller, and, in some cases, can send caller messages to more than one ACD via a Multi-Cast. The ACD Server queries the various queues and the availability information concerning ACD Agent positions via the PC User Controller (2), . . . , (106). Based on the information that it receives and passes on to the caller, the ACD Server can determine when an appropriate Agent position becomes available to respond to the caller request, and can then transmit information to the PSTN over link (107) connected to a signaling network (not shown), to set up a connection from the caller's telephone to the appropriate ACD, and can cause the ACD Call Controller to establish the connection to the Agent.

In order to preserve the privacy of the user (caller), and the ACD Agent, the server can keep the IP addresses of these two parties invisible one to another using techniques well known to Internet practitioners.

While FIG. 2 shows separate data links between the ACD Server and the individual ACDs, these data links can be replaced by an Internet connection; the Internet connection can be further utilized, advantageously, to interconnect the individual ACDs.

While FIG. 2 shows a separate ACD Server, this Server can be integrated into one of the ACDs of the group served by the ACD Server. Additionally, the role of the Server can be assigned to any ACD of the group, provided that ACD has the needed software, by linking the Server ACD to other ACDs through the Internet.

FIG. 2 also shows a separate ACD Server (110) connected to ACDs (111), . . . , (112). ACD Server (110) serves ACDs of a different company on the ACD Network. ACD Server (110) is connected to the Internet (20) by an Internet Link (113). Servers (101) and (110) communicate via the Internet (20). The communications can be used to establish calls between ACDs of the two companies. For such calls, authentication of the users is required and only limited data can be transmitted between the two servers. Filtering takes place in the ACD that collected the user information.

An ACD Group, such as ACDs (1), . . . , (102) can serve internal users, external users, or both. For example, the ACD Agents can be "Help" Agents of a software house, providing assistance to internal users (software developers), and external users, (customers). Accounting and billing information is collected for both internal and external users. Authentication of users is required if confidential files are to be transmitted and/or only selected, (i.e., paying), customers are to be served. Authentication techniques are well known in the prior art. Service parameters such as features, billing contract rates, and customer priority, are linked to customer verification and service profiles.

Figure 3A:
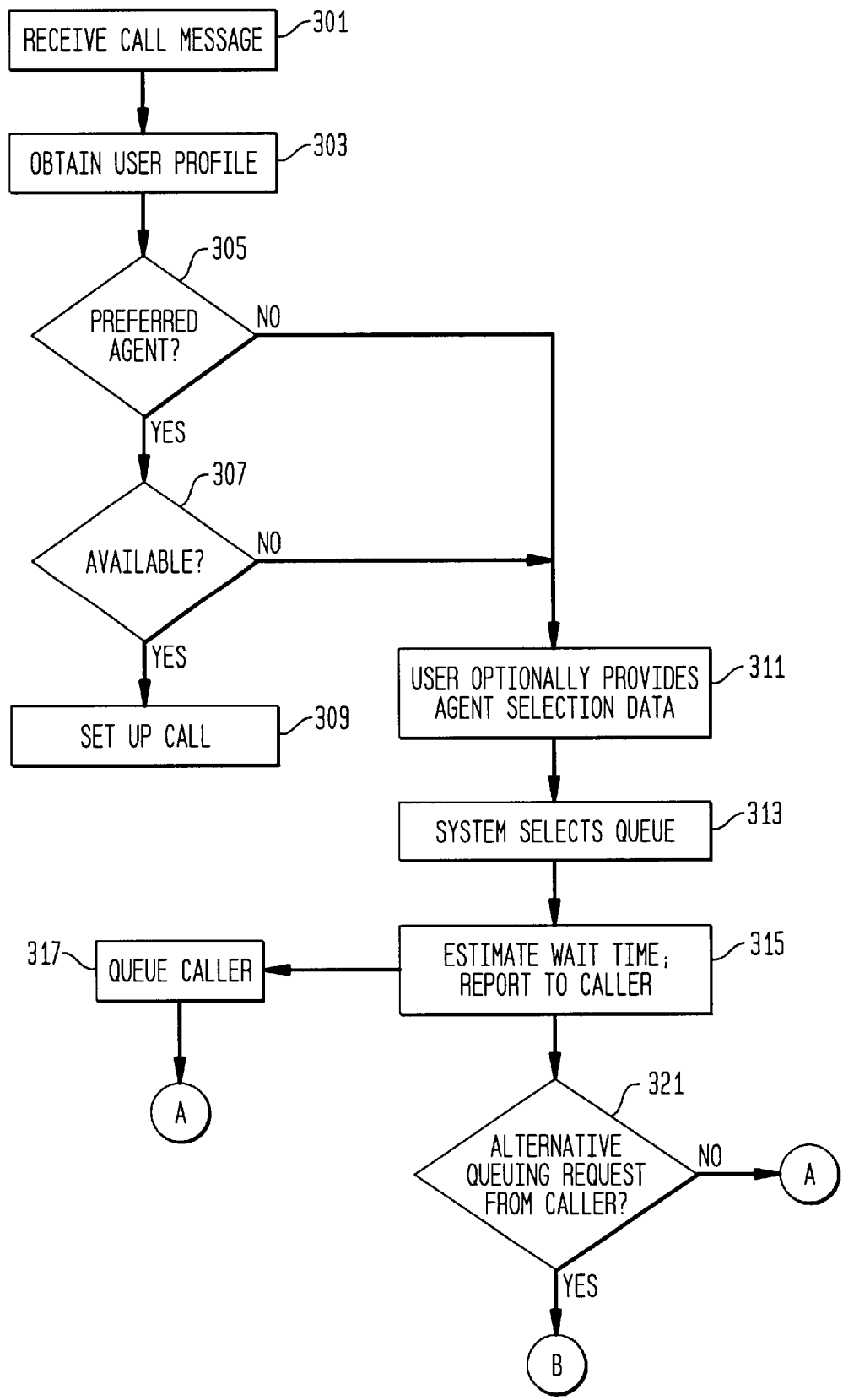
FIG. 3 is a flow diagram illustrating the processing of call requests received in accordance with Applicants' invention.
Figure 3B:
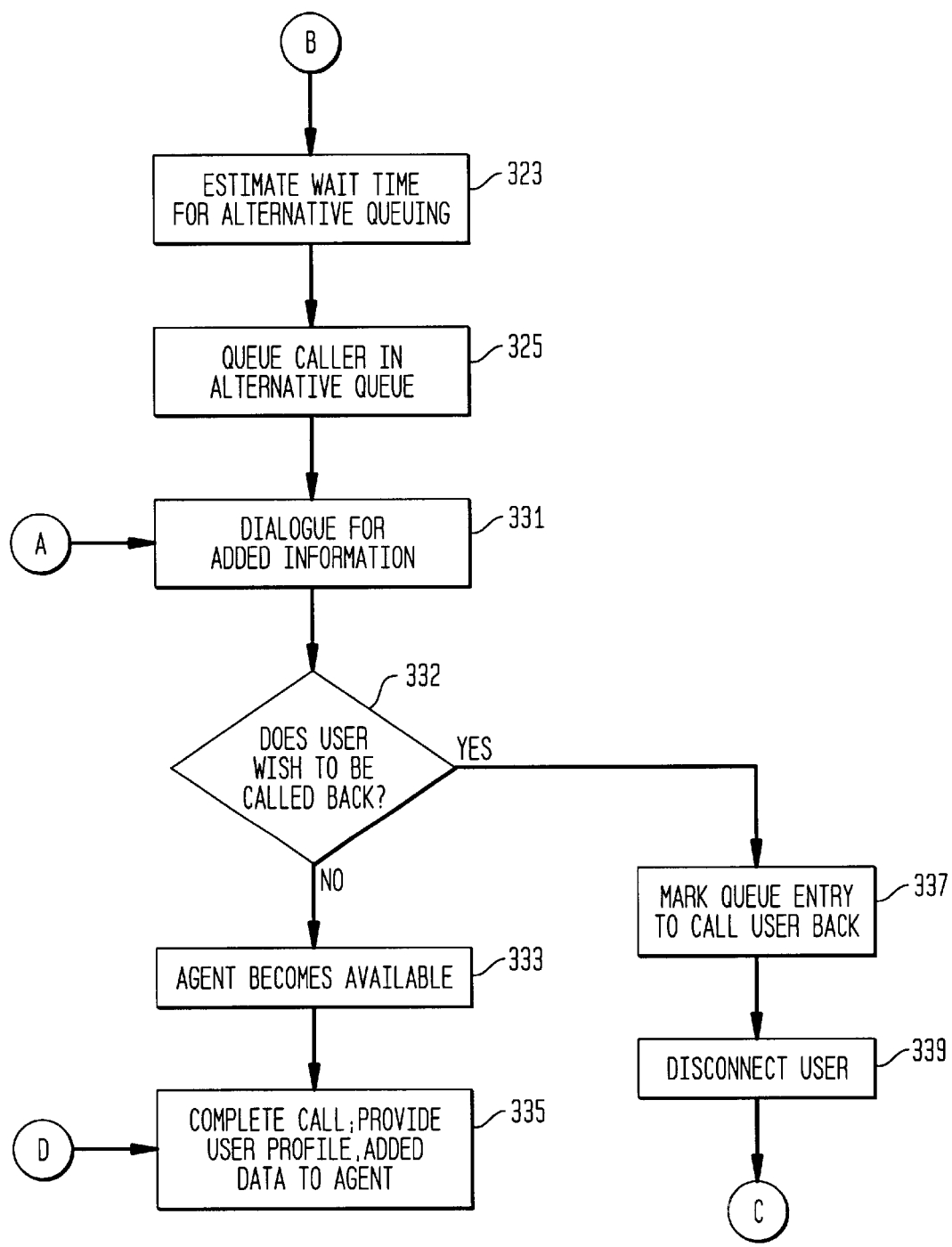
Figure 3C:
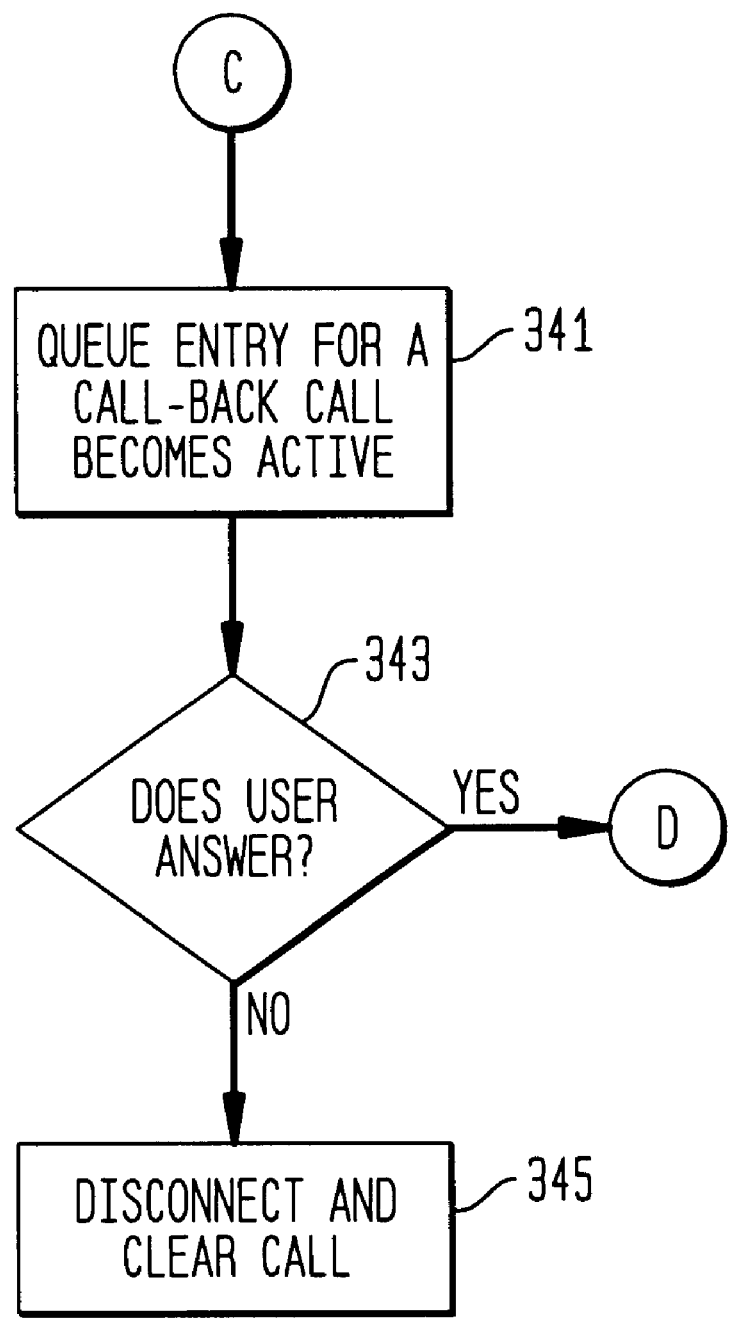

FIG. 3 is a flow diagram illustrating what happens when an ACD PC Controller receives a call message from a caller PC. The PC User Controller receives the call on that message. The PC User Controller obtains the user profile of the caller, Action Block (303). The user profile can include, for example, a language preference of the user so that the appropriate language team can handled the call. Test (305) determines whether that caller has registered a preferred Agent through a previous interaction, or as part of the dialog for this call. If so, then Test (307) determines whether that Agent is available, and if so, the call is then set up to that Agent, Action Block (335). If the result of either Test (305) or (307) is negative, then the caller, optionally, provides additional Agent selection data, Action Block (311). This additional selection data can be provided in response to information provided to the user from "Help" information. Based on this selection data, and on the user profile, the system selects the appropriate queue for this call, and initializes the queue entry to reflect data such as customer Agent preference, Agent or Agent Group preference. Multiple Agents or Agent Groups can be selected by the caller. In selecting the queue, the system selects the queue based on the appropriate function requested by the caller, and/or the appropriate level of priority, based on the call and/or service profile. The system then estimates the wait time in the queue, and reports this wait time to the caller, Action Block (315). One way of estimating this wait time is to estimate the time required for each already existing entry in the queue, based on the number of Agents currently active. The system then queues the caller, Action Block (317).

Adjustments in estimated wait time are made if the caller has selected more than one queue for service. Simple methods include not counting the caller in the selected queue with the longest wait time, or in any but the shortest wait time queue. When the caller hangs up prior to being served, the queue with the shortest time would be updated to remove the caller from the calculation of expected wait time.

The system periodically updates the queue displays to adjust the new wait time estimated at the ACD. Test (321) determines whether the caller has made a request for an alternative queue. If so, then the wait time for the alternative queue is estimated, Action Block (323), and reported to the caller. If the caller wishes, the caller can then be queued in the alternate queue, and the position in the original queue can either be maintained, or canceled. Following a negative result of Action Block (321), or following Action Block (325) or (327), a dialogue for added information is performed between the caller and the PC User Controller, Action Block (331). This is to save time when the Agent becomes available. This dialogue may indicate such items as the detailed reason for the call, and/or a history of previous calls on the same matter. It could also include responses to requests from the ACD for marketing or other data. Further, while in a specific queue, the caller can be asked to respond to directed questions, to gather important information to assist in serving the caller. Alternatively, or additionally, the user can use this opportunity to review and update information about the user, such as that maintained in the user profile. If desired, the dialog can be interrupted when the Agent answers, and can be resumed later.

The ACD can serve a business of the type which operates more efficiently if caller's send preliminary messages to the ACD. In this case, prior to making an attempt to connect the caller to an Agent, the ACD sends a message, possibly including a menu or a template to be filled out by the caller, so that the caller can supply data for the call to the ACD.

If a particular desired Agent is not available, the ACD server can be arranged to automatically page that Agent, or to attempt to reach the Agent at a cellular telephone number if the Agent is active in the system. Test (332) is used to determine whether the user wishes to be disconnected and called back when an appropriate Agent becomes available. The user can indicate this preference by means of a message or a keyed response to an announcement.

If the user wishes to stay on the line, then, subsequently, when an Agent becomes available, Action Block (333), the call is completed, Action Block (335), and user profile information and data added as a result of the dialogue, is presented to the Agent at the Agent position. When the Agent becomes available, the user can be notified on his/her screen and can then request the connection, or the voice connection can be automatically established. If the user wishes to be called back when an appropriate Agent becomes available, then the queue entry for the user is suitably marked to request the call-back, Action Block (337). The user is then disconnected, Action Block (339). Subsequently, when the queue entry for the user becomes active, Action Block (341), the user is called back Action Block (343). Test (345) is used to determine whether the user answers (within a reasonable period of time). If the user answers, the call is completed, Action Block (335), previously described. To make sure that the call-back reaches only the correct party of a residence serving several parties, the call-back can have a distinctive ring, a special message, or a unique called identification telephone number. If the user does not answer, the call is disconnected and cleared from the ACD, Action Block (345), or placed on a future call-back list.

Historical data concerning a user can be stored in the ACD and called up to the Agent when a connection is established.

While the caller is waiting for the ACD Agent to become available, the caller can send facsimile documents or E-Mail to his/her server so that these documents can be transmitted to the Agent when the Agent becomes available.

If an Agent is temporarily unavailable, but has indicated availability by a certain time, and if the user has requested this particular Agent, the user can be notified and, if the user is willing to wait, can have the call placed as an appropriate delayed queue entry. For this case, the call-back procedure is likely to be the most satisfactory. Similarly, when an Agent logs onto the system, the system can check whether that Agent had been requested and queue entries for that Agent, which might have been diverted to other queues, can be adjusted to request that Agent. Further, the Agent can review a log file to find out who requested service from that Agent, but was served by another Agent.

Figure 4:
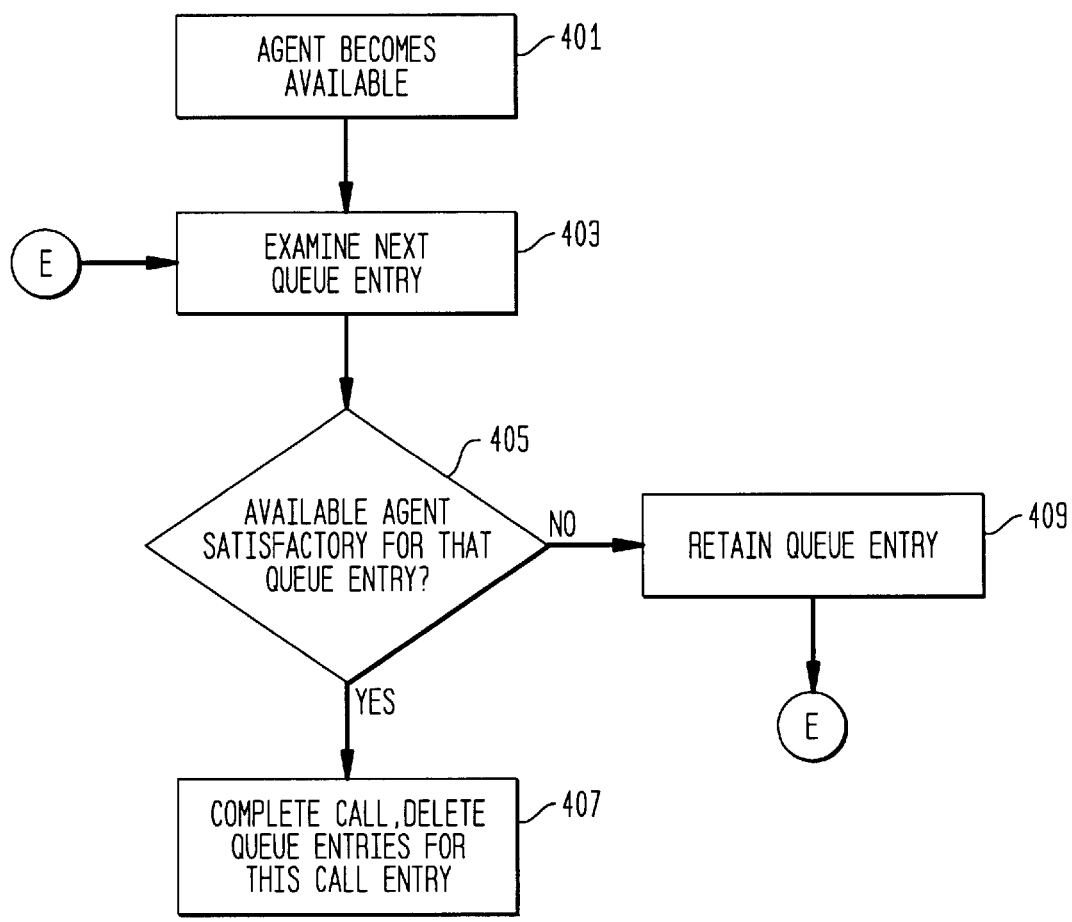
FIG. 4 is a flow diagram illustrating the process of determining which queue entry should be served by an Agent that becomes available.

FIG. 4 illustrates the actions performed in going through a queue to select the call that an Agent who has now become available will receive. An Agent becomes available, Action Block (401), the system then examines the next queue entry, (or in case of the first time, the initial queue entry), Action Block (403). The system tests whether this queue entry can be satisfactorily handled by the Agent that became available, Test (405). If the Agent can satisfactorily handle this call, then the call is completed, and all the queue entries for this caller are deleted from the ACD that serves the Agent, Action Block (407). If the Agent that has become available is not satisfactory for handling this queue entry, then the queue entry is retained, Action Block (409), in its present position, and Action Block (403) to examine the next queue entry, is entered.

For the case of an Agent logging onto the system, the same basic steps are followed as for an Agent becoming available. In addition, for the case of a user who had requested that Agent, but had been placed on a different queue because that Agent was not available, that user can then be placed on a queue for that preferred Agent.

ACDs register with a Server when they are turned on, or when they are opened, (for example, in the morning or following a weekend). The registering ACD presents to the Server, a list of queues with type, authority, and restriction information. The individual ACDs continually update the Server with changes in their queue information so that the Server can allocate calls based on up-to-date information.

The great flexibility of data interconnections in an Internet can be further used to advantage in accordance with the principles of this invention. The basic requirements are that a user can get access to queue data and Agent data of the ACDs which the user is accessing. Within limits, the user can also affect the selection of an Agent by indicating a willingness to wait until that Agent is available, and, if necessary, waiting without jumping ahead of other users. For priority services, such as emergency services, the user can jump ahead of other callers, and, in some cases, interrupt other calls, possibly using a call waiting type of interruption.

The user, therefore, can select Agents in ACDs belonging to two or more organizations. For example, if the initiator of the call is trying to solve a customer problem, the initiator may wish to confer with Service Technicians of several vendors supplying key parts to the equipment that appears to be in trouble. The caller can queue up on several ACDs, and be notified when a call can be established. At that time, the caller can request the establishment of the connection to the selected Agent, (or any Agent of the ACD if no specific selection has been made), and can request that the connection be established. The ACD must be adapted to wait a reasonable time for the establishment of a call under the circumstances that the queue entry is one associated with an Internet request.

Figure 5:
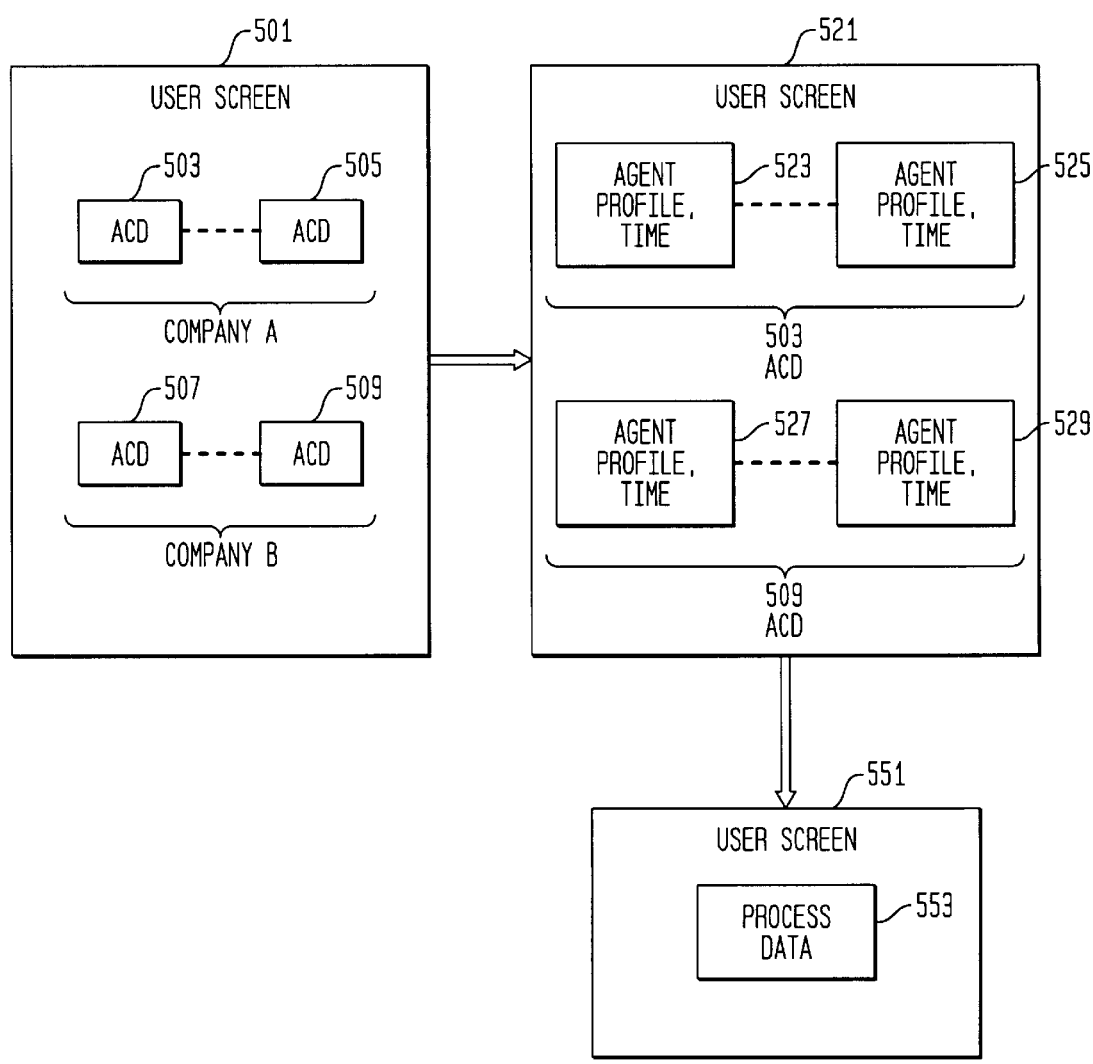
FIG. 5 is a diagram illustrating screen displays provided to a user.

FIG. 5 illustrates the progress of a call as seen on a user's screen. User screen (501), the initial screen, shows a plurality of ACDs (503), . . . , (505), all belonging to Company "A", and another series of ACDs (507), . . . , (509), belonging to Company "B".

Not all of this may be displayable on a single screen, so the term "screen" as used herein includes a group of connected screenings which can be accessed, (for example, by simply lowering down on the data file representing the screen). After the user has selected one or more ACDs, such as ACD (503) and (509), and has requested data from these ACDs, the user screen will display an Agent identification profile and expected waiting time for each of the Agents currently logged on for an ACD. For example, for ACD (503), a series of individual Agent identification profiles and times for the Agents of ACD (503) are represented by Blocks (523), . . . , (525). Similarly, if the user has requested this kind of information for ACD (509), which as previously indicated is an ACD of Company "B", different from Company "A", then the user screen will contain Agent identification profiles and times for the Agents, (527), . . . , (529) of the Agents of ACD (509). While waiting for an Agent to become available, the user can fill the user screen (551) with process data (553) concerning the transaction for which an Agent has been called. When an Agent becomes available, and the user signals via the Internet that a connection to that Agent should be established, and when that connection is established, the contents of the process data Block (553) are transmitted to the connected Agent. This caller information can be linked to a specific Agent, a sub-group of Agents, or to all Agents associated with a call. The caller can limit which Agent receives what information.

While in the queue, the caller can leave a recorded message for a specific Agent or for a general service Agent, and can then disconnect. The ACD has a Message Recorder (14) (FIG. 1), for recording such messages. The recorded message would maintain the same position in the queue as that of the caller. When that queue entry is served, the Agent hears the recorded message, and can either call the caller back or act upon the recorded message to meet the caller's needs.

This arrangement can also be used for establishing a conference connection in case, for example, it is necessary for an Agent from Company "A" and an Agent from Company "B" to talk, in order to further identify the source of the problem. The user requests the establishment of the conference connection when the user is informed that the second Agent has become available.

In this arrangement, the data connections among the ACD Controllers, the ACD Agents, and the user are maintained and used as required during the call. Actual voice connections are only established at the request of the user when such voice connections, for example, between a user and an Agent, are required.

The various ACDs of any one company can be scattered geographically, and the ACDs of different companies can be scattered or concentrated, but need not be at the same locations as the ACDs of a first company.

Figure 6A:
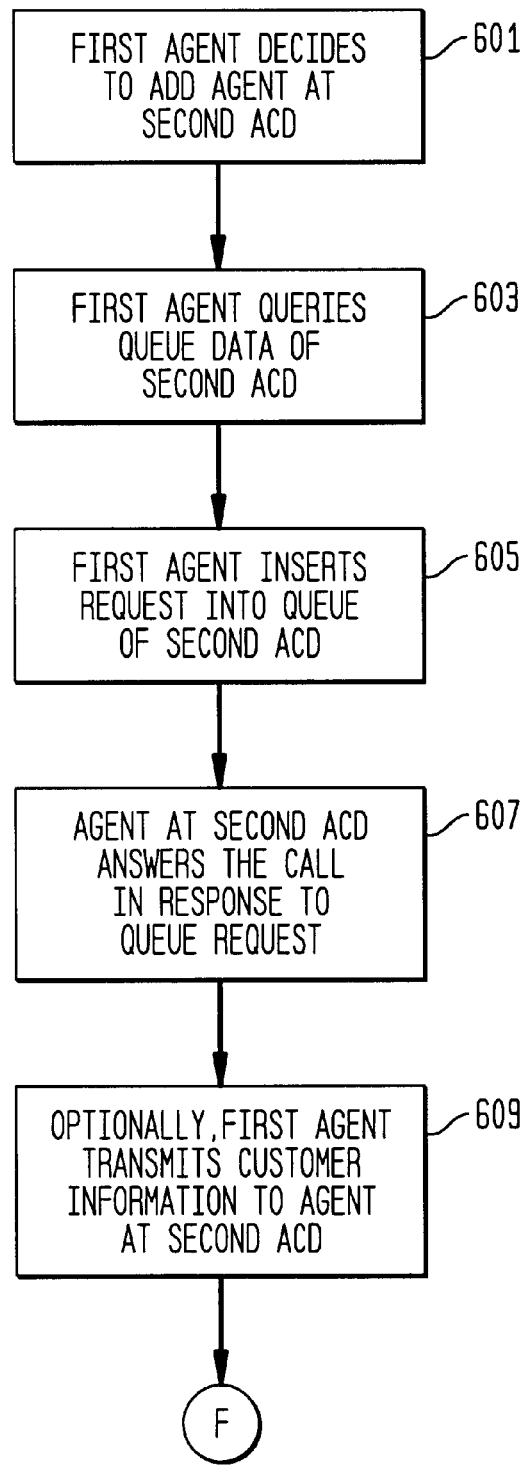
FIG. 6 is a flow diagram illustrating operations for adding an Agent at another ACD.
Figure 6B:
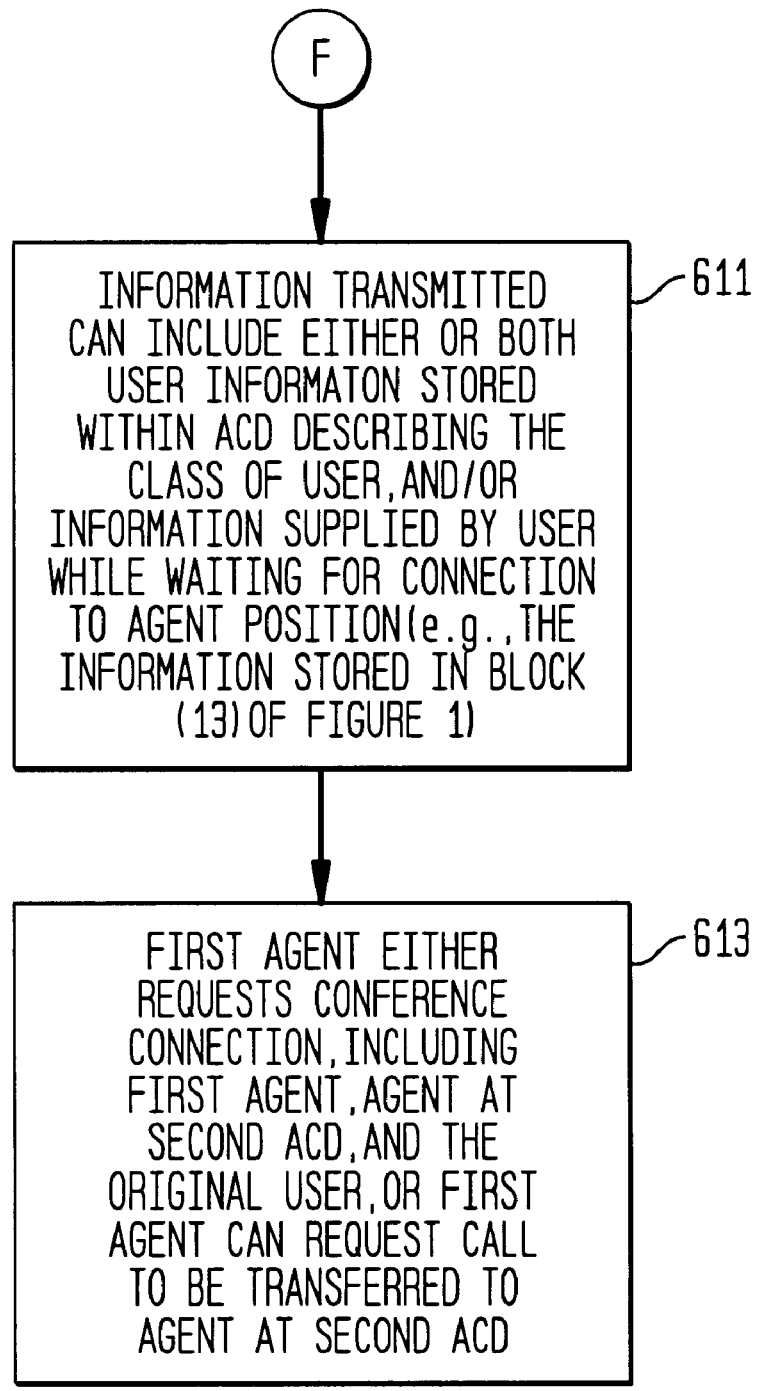

FIG. 6 is a flow diagram illustrating the operations for adding an Agent at another ACD, or for simply transferring the call to such an Agent. The first Agent (i.e., the Agent at the first ACD), decides to add on an Agent at a second ACD, Action Block (601). The first Agent queries queue data of the second ACD, Action Block (603). The first Agent inserts a request into a queue of the second ACD, Action Block (605). Eventually, an Agent at the second ACD answers, Action Block (607). The first Agent then has the option of transmitting to the second Agent position the user information of the caller, and/or the additional information transmitted from the caller to the ACD while the caller was waiting in the queue, Action Block (609). Thereafter, the first Agent can request a conference connection, including the second Agent, (including the first Agent, the caller and the second Agent), Action Block (611), or the first Agent can request a transfer of the call to the Agent at the second ACD, Action Block (613). The actions of FIG. 6 can then be repeated in case it is necessary to add additional Agents.

Figure 7:
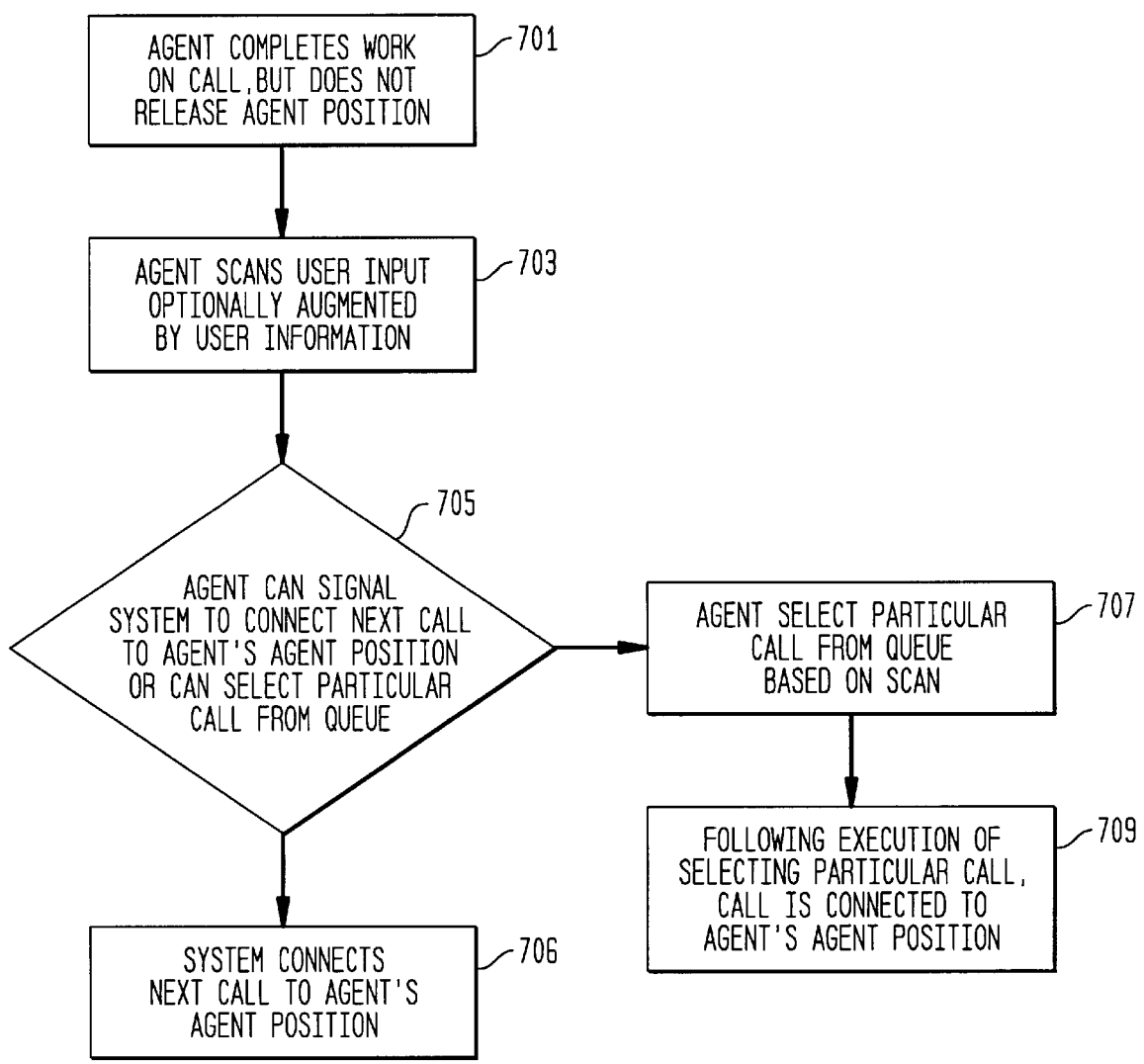
FIG. 7 describes actions for letting an Agent select the next call to be handled by that Agent.

FIG. 7 illustrates a capability for letting an Agent make a decision as to which call to answer next. The Agent completes work on a call, but does not release the Agent position, Action Block (701). Then, the Agent scans the user input, optionally augmented by the user information, Action Block (703). Based on the results of this scan, the Agent can either signal the system to connect the next call to the Agent's Agent position, Action Block (705), or the Agent can select a particular call from the queue based on the scan, Action Block (707). The system then connects this next call to the Agent's Agent Position, Action Block (706). The Agent can select a particular call from the queue based on the scan, Action Block (707). Following the execution of Action Block (707), the particular call is connected to the Agent's Agent Position, Action Block (709).

Alternatively, the Agent may decide that a particular call is actually in a non-optimum queue, and may re-direct the call from the original queue to the optimum queue with permission from the caller, based on the caller's user profile or other caller data. In doing so, the Agent would normally insert the call into the optimum queue at a position dictated by the time of arrival of the call, and the caller is so notified. Additionally, an Agent can send a message to a waiting caller without being connected to that caller, in order to serve that caller better when the Agent is actually connected, or, for example, by asking the caller to obtain information or measurements that will be required to handle the call, or that may, in fact, be the answer that the caller is waiting for, which the Agent can deduce from the content of the message sent by the caller. Note that the billing rate for a data response may be different than the billing rate for a voice response.

Additionally, an Agent may recognize the need for consultation with another Agent, possibly in an ACD of another company, based on the message provided by the customer. Appropriate billing information for such cases can be sent from the other Agents to the original ACD for serving that call, and can be accumulated in the billing data file (9) of the original ACD. The system can bill for the time connected to an Agent and/or the service rendered, and/or the products ordered.

Details of billing options and the amounts for the bills can be transmitted to the caller as a data message prior to establishing the voice connection to an Agent.

Information from the billing file can be displayed periodically to the caller so that the caller has an indication of the size of the bill being accumulated.

If it is necessary to pass a credit or debit card number from one ACD to another, for example, in the case where the second ACD belongs to a company which prefers to send out its own bills rather than having customers billed by an initial contact that is not an Agent of their company, the credit or debit card identification can be sent from between ACDs using appropriate agreed upon permission and security arrangements.

The above description is of one preferred embodiment of Applicants' invention. Other embodiments will be apparent to those of ordinary skill in the art. The invention is only limited by the attached Claims.

What is claimed is:

1. A method of establishing a telephone call from a caller station to an Automatic Call Distributor (ACD) Agent position, comprising the steps of:
   establishing a data connection between a caller terminal and a user controller of the ACD;
   accessing queuing data of said ACD over said data connection;
   a user at said caller station, responsive to receipt of said queuing data, transmitting commands from said caller terminal;
   combining said commands with said queuing data to select an Agent position; and
   establishing a connection between said caller telephone and an Agent position;
   said agent position selected in conformance with said commands and the queuing data.

2. The method of claim 1, wherein the step of accessing queuing data comprises the steps of:
   said User Controller providing wait time information to said caller terminal; and
   wherein a caller at said caller terminal, responsive to said wait time information, provides additional commands to said User Controller.

3. The method of claim 1, wherein said User Controller further has access to user profile information, and combines said user profile information with said commands and said queuing data for selecting said Agent position.

4. The method of claim 3, wherein said user profile information comprises information for selecting a preferred Agent, and wherein said preferred Agent is selected if said preferred Agent is available.

5. The method of claim 1, wherein said queuing data comprises a plurality of queue entries, wherein ones of said queue entries identify a caller, and provide additional data, said additional data for selecting a connection to specific ones of said Agent positions.

6. The method of claim 1, wherein said User Controller communicates with a Call Controller for establishing connection to said selected Agent position.

7. The method of claim 1, wherein said caller terminal is connected to said User Controller via the Internet.

8. The method of claim 1, wherein said caller station is connected to said ACD by the Public Switched Telephone Network (PSTN).

9. The method of claim 1, wherein said ACD comprises a plurality of queues, and wherein a queue for this call is selected based in part, on user provided commands.

10. The method of claim 1, wherein said ACD comprises a plurality of queues, and wherein a queue for this call is selected based in part, on user profile data.

11. Apparatus for establishing a telephone call from a caller station to an Automatic Call Distributor (ACD) Agent position, comprising:
    means for establishing a data connection between a caller terminal and a user controller of the ACD;
    means for accessing queuing data of said ACD over said data connection;
    means, responsive to input from a user at said caller station in response to receipt of said queuing data for transmitting commands from said caller terminal;
    means for combining said commands with said queuing data to select an Agent position; and
    means for establishing a connection between said caller telephone and an Agent position;

said Agent position selected in conformance with said commands and the queuing data.

12. The apparatus of claim 11, wherein said user controller provides wait time information to said caller terminal; and said user responsive to said wait time information for causing said means for transmitting to transmit additional commands to said user controller.

13. The apparatus of claim 11, wherein said user controller further has access to user profile information;

wherein said user controller combines said user profile information with said commands and said queuing data for selecting said Agent position.

14. The apparatus of claim 13, wherein said user profile information comprises:

information for selecting a preferred Agent; and wherein said user controller selects said preferred Agent if said preferred Agent is available.

15. The apparatus of claim 11, wherein said queuing data comprises:

a plurality of queue entries, wherein ones of said queue entries identify a caller and provide additional data;

said additional data for selecting a connection to specific ones of said Agent positions.

16. The apparatus of claim 11, wherein said controller communicates with a call controller of said ACD for establishing a connection to said selected Agent position.

17. The apparatus of claim 11, wherein said caller terminal is connected to said user controller via the Internet.

18. The apparatus of claim 11, wherein said caller station is connected to said ACD by the Public Switched Telephone Network (PSTN).

19. The apparatus of claim 11, wherein said ACD comprises:

a plurality of queues; and wherein a queue for this call is selected based in part, on user provider commands.

20. The apparatus of claim 11, wherein said ACD comprises:

a plurality of queues; and wherein a queue for this call is selected based in part, on user profile data.

* * * * *